United States Patent
Jia

(10) Patent No.: US 7,864,898 B2
(45) Date of Patent: Jan. 4, 2011

(54) SYSTEMS AND METHODS FOR SIGNAL ACQUISTION IN NAVIGATIONAL SATELLITE SIGNAL RECEIVERS

(75) Inventor: Zhike Jia, San Jose, CA (US)

(73) Assignee: SIRF Technology Holdings, Inc., San Jose, CA (US)

( * ) Notice: Subject to any disclaimer, the term of this patent is extended or adjusted under 35 U.S.C. 154(b) by 823 days.

(21) Appl. No.: 11/383,935

(22) Filed: May 17, 2006

(65) Prior Publication Data

US 2007/0268960 A1   Nov. 22, 2007

(51) Int. Cl.
  *H03D 1/00* (2006.01)
  *H04B 1/00* (2006.01)
  *H04L 27/00* (2006.01)
  *G01S 1/00* (2006.01)

(52) U.S. Cl. .............. 375/343; 375/148; 375/150; 375/316; 342/357.01; 342/357.15

(58) Field of Classification Search .......... 375/130, 375/147, 150, 343, 346, 350; 342/94, 357.02, 342/357.06, 357.12, 357.15; 701/216; 370/210
See application file for complete search history.

(56) References Cited

U.S. PATENT DOCUMENTS

| | | | |
|---|---|---|---|
| 6,125,135 A | 9/2000 | Woo | |
| 6,363,049 B1 * | 3/2002 | Chung | 370/210 |
| 6,606,349 B1 | 8/2003 | Kudhrethaya et al. | |
| 6,643,320 B1 | 11/2003 | Wilcox | |
| 6,646,596 B2 | 11/2003 | Syrjarinne | |
| 7,463,189 B2 * | 12/2008 | Bryant et al. | 342/357.12 |
| 7,483,501 B1 * | 1/2009 | Michaels, Jr. | 375/346 |
| 2002/0050944 A1 * | 5/2002 | Sheynblat et al. | 342/357.06 |
| 2003/0076876 A1 * | 4/2003 | Katz et al. | 375/149 |
| 2005/0046614 A1 * | 3/2005 | Akano | 342/357.02 |
| 2005/0169350 A1 * | 8/2005 | Schilling et al. | 375/142 |
| 2006/0222058 A1 * | 10/2006 | Simic et al. | 375/150 |
| 2006/0293852 A1 * | 12/2006 | Tsurumi | 701/216 |
| 2007/0024499 A1 * | 2/2007 | Bochkovskiy et al. | 342/357.12 |
| 2007/0052584 A1 * | 3/2007 | Horton et al. | 342/357.06 |
| 2007/0116158 A1 * | 5/2007 | Guo et al. | 375/343 |

* cited by examiner

*Primary Examiner*—Mohammad H Ghayour
*Assistant Examiner*—Eboni Giles
(74) *Attorney, Agent, or Firm*—Mark J. Danielson; Pillsbury Winthrop Shaw Pittman LLP

(57) ABSTRACT

The present invention provides an elevation based adaptive scheme for setting power threshold in the acquisition of navigational satellite signals. In an embodiment, the elevation based adaptive scheme uses a different series of power thresholds to acquire signals from satellites at different elevation angles instead of using one threshold for all satellites, as is done in the prior art. This scheme exploits the fact that the received signal power level depends on the elevation angle of the satellite at the receiver. This scheme also takes into account the antenna gain variation without having to measure the antenna gain variation.

29 Claims, 5 Drawing Sheets

SYSTEMS AND METHODS FOR SIGNAL ACQUISTION IN NAVIGATIONAL SATELLITE SIGNAL RECEIVERS

FIELD OF THE INVENTION

The present invention relates generally to navigational signal receivers, and more particularly, to efficient and fast techniques of navigational satellite signal acquisition.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from a sufficient number of satellites, a GPS receiver can calculate its position, velocity, altitude, and time.

The GPS receiver has to acquire and lock onto at least four satellites in order to derive the position and time. Usually, a GPS receiver has many parallel channels, each receiving signals from one visible GPS satellite. The acquisition of the satellite signals involves a two-dimensional search of carrier frequency and the pseudo-random noise (PN) code phase. Each satellite transmits signals using a unique 1023-chip long PN code, which repeats every millisecond. The receiver locally generates a replica carrier to wipe off residue carrier frequency and a replica PRN code sequence to correlate with the digitized received satellite signal sequence. During acquisition stage, the code phase search step is a half-chip for most navigational satellite signal receivers. So the full search range of the code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used signal integration methods to acquire GPS signals. Coherent integration provides better signal gain at the cost of larger computational load, for equal integration intervals.

The power associated with noncoherent integration of one millisecond correlation is $$\text{Power} = \sum_{n=0}^{N-1} (I(n)^2 + Q(n)^2) \quad (1)$$

and the power associated with coherent integration is $$\text{Power} = \left(\sum_{n=0}^{N-1} I(n)\right)^2 + \left(\sum_{n=0}^{N-1} Q(n)\right)^2 \quad (2)$$

where I(n) and Q(n) denote the one-millisecond correlation values from the baseband section at interval n, and N denotes the desired number of one-millisecond integration intervals.

The widely adopted criterion to declare success of acquisition is that the accumulated power exceed a preset power threshold. The power threshold setting method for signal acquisition has great impact on signal acquisition performance, including sensitivity, acquisition time, and probability of signal detection and false alarm, etc. Algorithms have been developed for setting acquisition thresholds. Published U.S. Patent Application 2003/0090414 selects the channel with the highest Signal-to-Noise ratio and sets the threshold based on this to select a set of four satellites with the highest Signal-to-Noise ratios. U.S. Pat. No. 6,125,135 derives a table of thresholds based on Carrier-to-Noise Ratio (CNR) for L1 P code acquisition but does not address C/A code acquisition. U.S. Pat. No. 6,606,349 derives the threshold based on the signal power. Finally, U.S. Pat. No. 6,643,320 has each correlator use a different threshold, the different thresholds being derived by the known distance to the satellite and the existing CNR. Thus the thresholds are functions of correlation noise level and predicted signal strength. Any satellite which is out of view or a PRN code that is not used by any of the satellites is used in a separate channel to estimate the noise level.

Whether the threshold is fixed or adaptive, one common method of these algorithms is that all satellites signals are acquired based on a single threshold except in the case of the U.S. Pat. No. 6,643,320. However, in U.S. Pat. No. 6,643,320 the antenna gain variation is not considered. It is very important to consider the transmitted power and the antenna gain in determining the acquisition threshold. The received signal power levels from satellites at different elevation angles are different. In addition, the difference in the received signal power levels may be as high as 8 dB when the gain of the receiver antenna is considered. Therefore, it is hard to find a common threshold for all satellite channels, especially for weak signals because of the small margin between signal and noise level. If the threshold is high, then the signal from low elevation satellites might not be acquired. On the other hand, if the threshold is low, then the false alarm rate for high elevation satellites increases greatly. To solve this problem, the present invention provides an elevation based adaptive threshold scheme for setting power thresholds. The present invention requires less computation than the scheme proposed in U.S. Pat. No. 6,643,320 because no distance computation between the receiver and each of the satellites is involved and the antenna gain variation is also taken into account without measuring the gain pattern. Further, U.S. Pat. No. 6,643,320 does not take into consideration the transmitter antenna gain variation with the elevation angle.

SUMMARY

The present invention provides an elevation based adaptive scheme for setting power threshold in the acquisition of navigational satellite signals. This scheme provides improved acquisition sensitivity, shortened acquisition time of signals from low elevation satellites, and decreased probability of false alarms.

In an embodiment, the elevation based adaptive scheme uses different sets of power thresholds to acquire signals from satellites at different elevation angles instead of using one threshold for all satellites. This scheme exploits the fact that the received signal power level depends on the elevation angle of the satellite at the receiver. This scheme also takes into account the antenna gain variation without having to measure the same.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION

Figure 1:
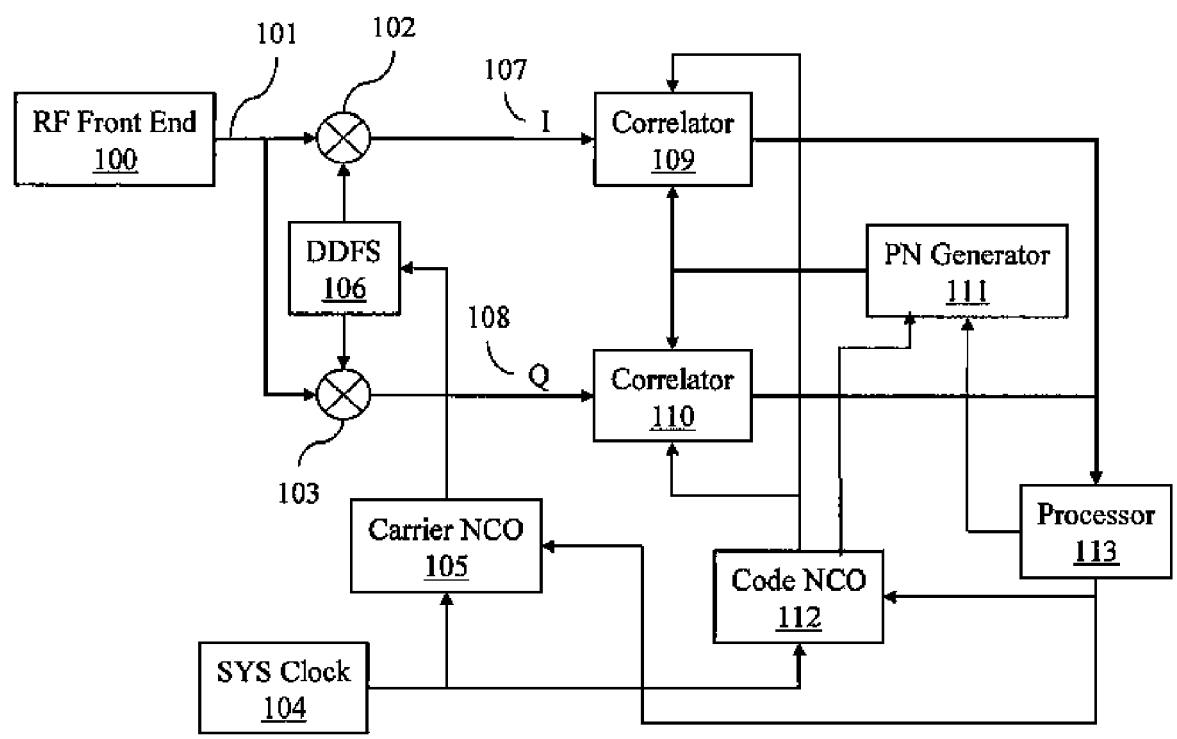
FIG. 1 is a block diagram illustrating a GPS receiver according to an embodiment of the invention.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The processor 113 receives one millisecond integrated (correlated) I and Q values from the GPS baseband section described above. In order to acquire a GPS signal in the processor 113, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration intervals.

To acquire a satellite signal the coherent or the non-coherent accumulated power values are compared with pre-determined power threshold values. If the coherently/non-coherently integrated power exceeds the threshold over a given number of attempts, then the signal is assumed to be acquired.

The value of the power threshold is determined by four factors (1) desired signal detection probability; (2) desired false alarm probability; (3) noise level in the receiver; and (4) the received signal power level. When the desired signal detection probability and desired false alarm rate are given, we can get the power thresholds at different signal-to-noise ratio (SNR) either by experiments or theoretical calculation using the method described in Appendix B of Chapter 8, of the book *Global Positioning System: Theory and Applications*, Volume I, Edited by Bradford W Parkinson and James J. Spilker Jr and published by American Institute of Aeronautics and Astronautics, Inc, 1996, Washington D.C. Table 3 shows the relation between SNR and power thresholds at given signal detection probability and desired false alarm rate.

The first three factors given above are elevation independent while the fourth one is highly dependent on the elevation angle of the satellite at the receiver. In a preferred embodiment, the elevation range (0 to 90 degrees) for the visible satellites is divided into 18 bands of five-degrees each. Every said five-degree band uses its own power threshold. The maximum received signal power from satellites in one elevation band is obtained under clear sky condition with no obstruction between the receiver and the satellites. This received signal power is successively decreased by an appropriate amount under the conditions of additional signal attenuation, such as urban or foliage areas, etc.

Figure 3:
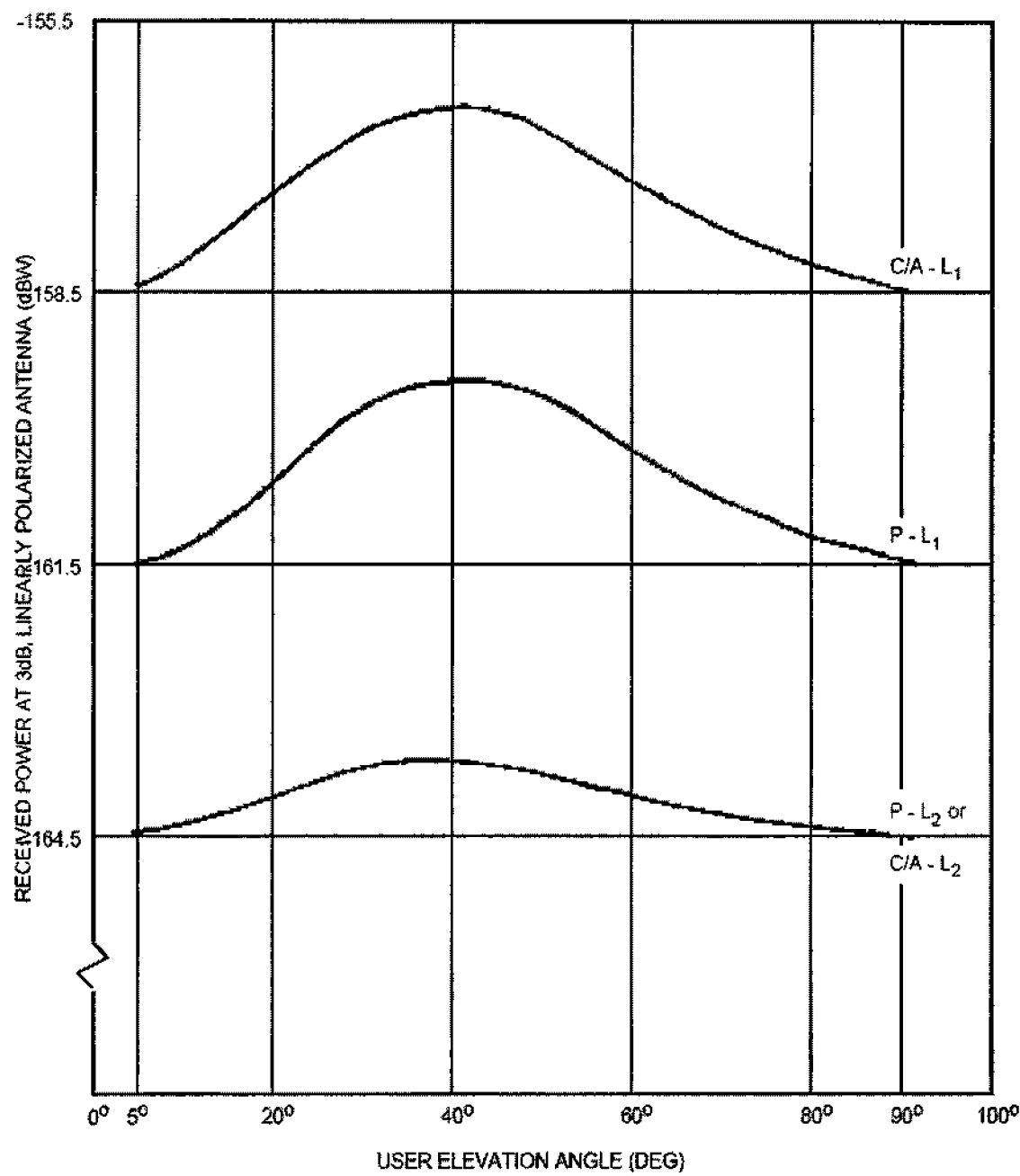
FIG. 3 is a plot of received satellite signal power as a function of elevation angle for a 3 dB gain antenna.
Figure 4:
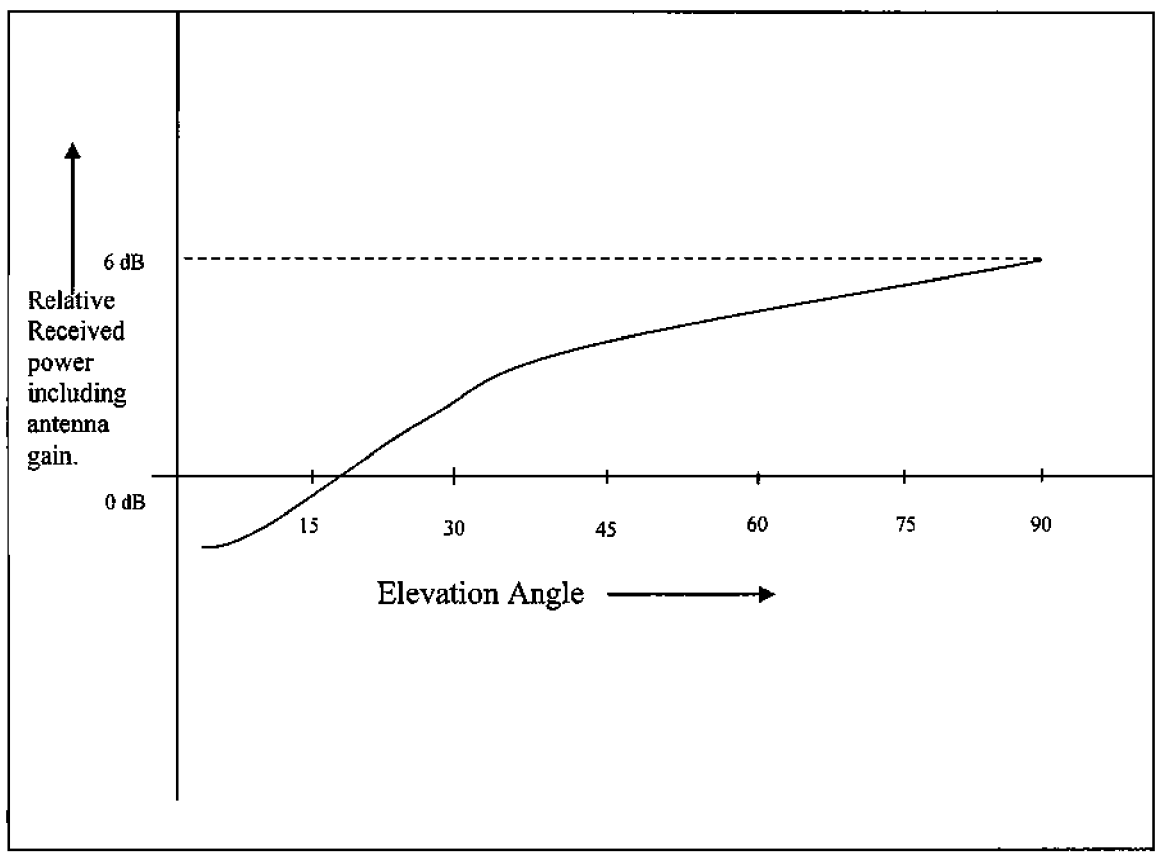
FIG. 4 is a plot of received satellite signal power as a function of elevation angle when the effect of a typical antenna gain is considered.

In a navigational satellite signal receiver operating under open sky condition without any obstructions, the received signal power level is only dependent on the elevation angle as shown in FIGS. 3 and 4. The received power levels can be considered as constants in open sky condition within a band of elevation angles. Based on this property, the received signal power level under clear sky condition can be measured and stored in the memory of the receiver, as shown in Table 1, which can be calibrated whenever the receiver is powered up later. When a GPS receiver starts acquiring the satellite signals in hot or warm start mode, the target satellite elevation angle is known, we can get the maximum received signal power from Table 1. But there might be some additional attenuation of signal due to the obstructions in the signal propagation path. Therefore, the predicted signal power is started from the high value to lower values during the acquisition process until the minimum value is reached or the signal is acquired. Table 1 provides the highest power levels corresponding to the different possible elevation angle bands. The value of the noise level can also be similarly obtained as explained later in section 2. Therefore based on Table 3, we can use the signal-to-noise ratio as an index to get the corresponding threshold for acquisition of satellite signals in the elevation band. In the case of no prior knowledge of the elevation of the satellite, as in the case of cold start mode, we assume the elevation angle is 90 degree in order to avoid possible high false alarm rate.

In Section 1 below, an expression is derived for the received power level as a function of the elevation angle. The received signal power variation with elevation angle is presented both without and with antenna gain consideration for a typical receiver antenna. This is followed by a description of a method to measure and calibrate the power level at different elevation angles. In Section 2, a method of measuring the noise floor is described. Based on the signal power level and noise floor, an elevation based adaptive threshold scheme is given in detail in Section 3.

1. Received Signal Power Levels at Different Elevation Angles

When there are no interference signals such as co-channel interference, multipath interference, etc., the signal power level at the receiver from any one of the satellites is dependent on the following three factors:

(1) transmitted signal power from the satellite;
(2) attenuation due to propagation;
(3) gain of receiver antenna.

Figure 2:
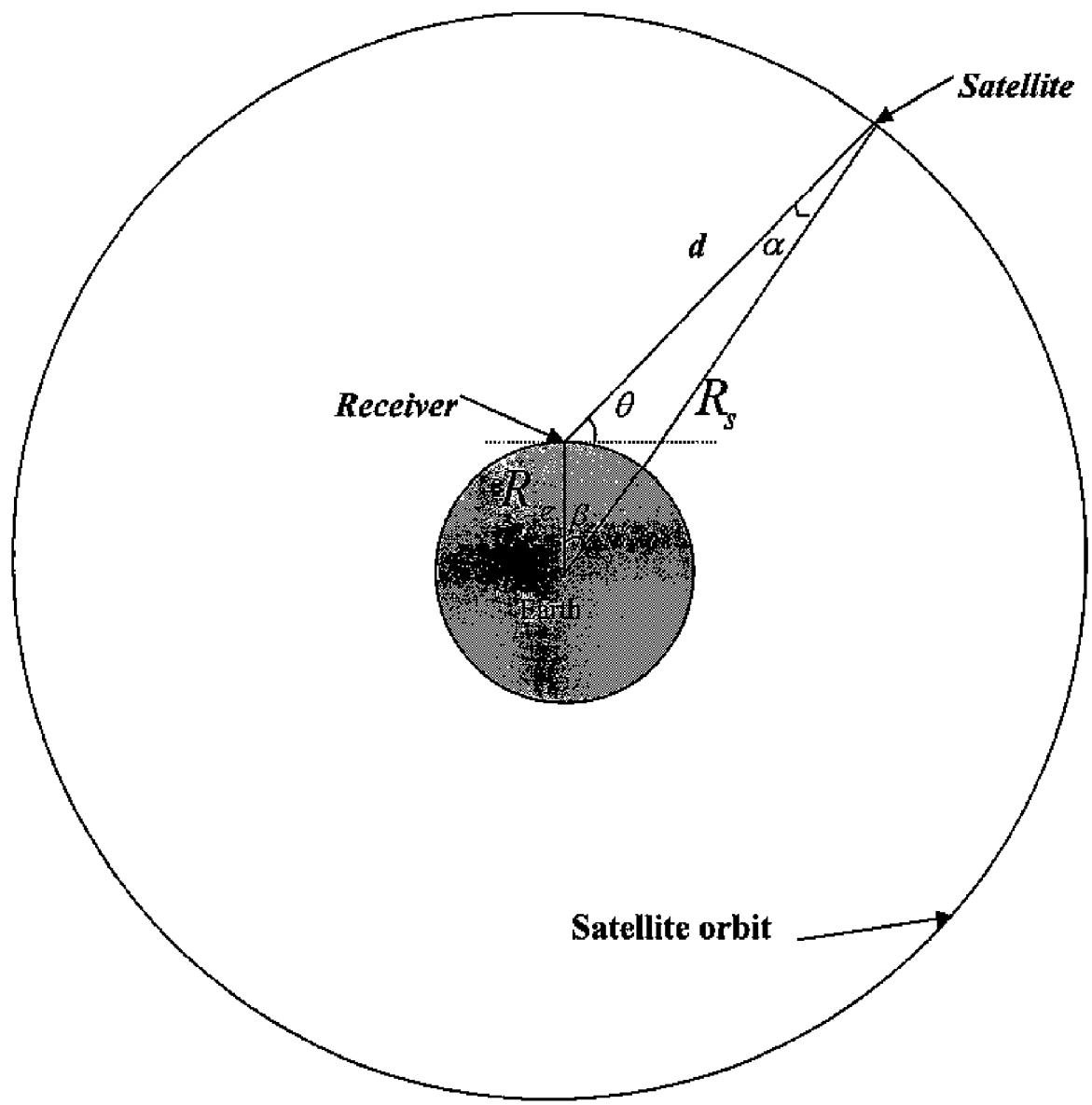
FIG. 2 is a diagram illustrating the relative position of a receiver to a typical GPS satellite.

The important factor for signal attenuation is the distance of signal propagation, which is the distance between the receiver and the satellite. (Here secondary factors, such as the additional attenuation from the atmosphere, which are relatively small are not considered.) The satellite orbit is an ellipse, but it is very close to a circle as shown in FIG. 2. Therefore, a circle can be assumed to represent the satellite orbit without lose of accuracy. Further, the shape of the earth may be assumed to be a sphere. Let d be the distance from the receiver to the GPS satellite; $R_e$ be the radius of the earth and $R_s$ be the radius of the satellite orbit. Although there are 6 orbit planes, the radius of each orbit is the same. Both $R_e$ and $R_s$ can be considered as constants. $\theta$ ($0 \leq \theta \leq 90°$) is the elevation angle at the receiver to the satellite shown in FIG. 2. According to the law of sines, the result is $$\frac{R_e}{\sin\alpha} = \frac{d}{\sin\beta} = \frac{R_s}{\sin(\theta + 90°)} \quad (3)$$

Based on Equation 3, the distance d from receiver to satellite can be given as Equation 4 below.

$$d = \frac{\sin\left(180° - (90° + \theta) - \arcsin\left(\frac{R_e}{R_s}\sin(\theta + 90°)\right)\right)}{\sin(\theta + 90°)} R_s$$

$$= \frac{\cos\left(\theta + \arcsin\left(\frac{R_e}{R_s}\cos\theta\right)\right)}{\cos\theta} R_s \quad (4)$$

According to Equation 4, it is clear that the distance d is only a function of the elevation angle $\theta$, and does not depend on the azimuth angle or the location of the receiver. That is, if the elevations from the receiver to different GPS satellites are the same, then the distances of lines-of-sight from the GPS receiver to the different satellites are the same, even if these satellites are in different orbit planes.

The range of elevation is from 0 degree to 90 degrees. The variation of the received power with elevation angle for a 3 dB receiver antenna as given in the official GPS document GPS-ICD-200 is shown in FIG. 3. This shows that the maximum power is at an elevation angle of about 40 degrees. However, a typical receiver antenna usually has a maximum gain at the center which decreases as the elevation angle is decreased. For example, in the case of a SMA-35 GPS patch antenna, the typical absolute gain at zenith (90 degree) is 5 dBi while at 10 degrees elevation it is about −1 dBi. Thus, in this case, the difference is around 6 dB. Therefore, most of the time, the received power variation with elevation angle can be represented by the plot of FIG. 4 when antenna gain is considered. In FIG. 4, the maximum received power occurs at an elevation angle of 90 degrees due to the effect of the typically GPS receiver antenna gain.

From the above analysis, if the variation of attenuation with respect to atmosphere is not considered, then the signal attenuation is determined only by the elevation angle of the satellite from the receiver to the satellite. That is, if the elevation angles of different satellites from the receiver are the same, then the attenuation of signals from the different satellites should be the same.

Because the received signal power level is independent of time, we can measure the received satellite power levels at different elevations through a training process and store these values in memory to calculate the acquisition thresholds later. This training process only needs to be done once unless the memory is erased. During the training process, the receiver should be put in an open sky environment, that is, where there are no additional attenuations in the signal propagation path. Thus the received signal level is the strongest one. The difference of received signal power levels from different satellites, whose elevation angles difference is within 5 degrees, is very small. Therefore, the range of elevation angles can be divided into 18 groups with increment in step of 5 degrees as shown in the following table.

TABLE 1

Received signal power at different elevation angles

| Group Number | Elevation Range (degrees)* | Received Signal Power |
|---|---|---|
| 1 | [0, 5) | POWER 1 |
| 2 | [5, 10) | POWER 2 |
| 3 | [10, 15) | POWER 3 |
| ... | ... | ... |
| 18 | [85, 90] | POWER 18 |

*The range includes the starting value but not the last value, i.e., in [0,5) the range includes 0 but not 5, but in the case of [85, 90] both values are included.

During the training process, the received signal powers are recorded and averaged for each elevation group. After obtaining enough samples, the last column of Table 1 can be populated based on the average value of samples. The training process is terminated as soon as Table 1 is fully populated.

2. Noise Floor of the Receiver

Noise floor is an important parameter of a navigational satellite signal receiver. The noise floor is mainly determined by the receiver itself including hardware design, and components. For a given receiver, the hardware components do not change and if the ambient temperature is constant, then the component noise characteristics remain unchanged during the device lifetime. Thus the noise floor of a given receiver is only related to ambient temperature.

The effect of the ambient temperature to the noise floor level is due to thermal noise and component characteristics. The industrial standard operating temperature range is from −40° C. to 85° C. If the components used by the receiver meet this industrial standard, their characteristics do not change with temperature within that range. However, if the temperature changes beyond operating temperature range of the components, their characteristics are unpredictable and might greatly differ from their nominal values. Fortunately, in most cases, the change of ambient temperature is within the operating temperature range of the key components. On the other hand, the thermal noise generated is proportional to the ambient temperature. When the temperature changes from −40° C. to 85° C., the thermal noise may increase by about 2 dB.

The ambient temperature can be obtained through a temperature sensor in the receiver. Therefore, through a training process the noise floor level for different temperature may be measured and stored in memory as shown in Table 2.

TABLE 2

Noise floor for different ambient temperatures

| No | Temperature (Celsius degrees) | Noise Floor |
|---|---|---|
| 1 | −40 | N1 |
| 2 | −35 | N2 |
| ... | ... | ... |
| 25 | 80 | N25 |
| 26 | 85 | N26 |

The noise floor values N1, N2, . . . in the rightmost column of Table 2 are measured at the corresponding ambient temperatures shown in the middle column. It should be noted that although the noise floor levels are indexed by temperatures, they are not merely thermal noise. When measuring noise floor during the training process, the signal input cable from the antenna is disconnected in order to make sure no input signal is received. If the input cable cannot be disconnected, the replica PN sequence of an invisible or out of the constellation satellite is chosen.

In the training process, we only measure 26 noise floor values corresponding to 26 temperature values. For those temperatures, which are not in Table 2 but within the range between −40° C. to 85° C., an interpolation method may be used.

However, if there is no temperature sensor in the receiver or no other schemes to measure the ambient temperature, then the ambient temperature cannot be determined. Usually there are multiple parallel channels in one navigational satellites signal receiver. Thus, one spare channel can be used to measure noise floor after the receiver is powered on. The method is to select the PRN code which belongs to the group but is guaranteed to be not present in the input signal or not visible at that time and then get the average power of the noise or interference. Using this method, we can get the real time noise floor level and monitor any variation.

3. Elevation Based Adaptive Thresholds Setting Scheme

In general, the signal acquisition process is a two-dimensional search in both carrier frequency and code phase. At one dwell of carrier frequency and code phase, if the integration power, as shown in Equation 1 or Equation 2, is greater than the predetermined threshold in several attempts, we can assume the signal is detected. The requirements in setting a proper acquisition threshold is to set the probability of the correct signal detection as high as possible while keeping the false alarm rate as low as possible. Higher thresholds can help to lower the false alarm rate but increase the possibility of missing the detection of weak signals. Lower thresholds are useful for weak signal detection at the cost of higher false alarm rates.

In theory, the value of the threshold is a function of the desired probability of signal detection ($P_d$), desired probability of false alarm ($P_f$) and input signal to noise ratio. Thus, after proper values of $P_d$ and $P_f$ are chosen, the thresholds values corresponding to different input signal to noise ratios can be determined. These values can be determined either through theoretical computation or practical testing in the training process. Table 3 is shows threshold values corresponding to different input signal to noise ratios at given $P_d$ and $P_f$.

TABLE 3

Thresholds with different signal to noise ratios

| No | Signal to noise ratio (dB) | Threshold |
|---|---|---|
| 1 | 50 | TH1 |
| 2 | 49 | TH2 |
| ... | ... | ... |
| 39 | 11 | TH39 |
| 40 | 10 | TH40 |

In the threshold setting scheme of the present invention, the threshold is not a single value. Instead, it includes a series of candidate values corresponding to signal to noise ratios. Based on the descriptions in Section 1 and 2, the input signal to noise ratio is dependent on the elevation degrees from the satellites to the receiver and the ambient temperature noise level. Therefore, we can predict the signal to noise ratio of the satellite to be acquired and choose proper thresholds for the satellites accordingly. If the predicted signal to noise ratio is not available in the table, then the closet one may be chosen from the table. For example, if the predicted signal to noise ratio is 48.8 dB, we can use the threshold corresponding to 49 dB in Table 3. The flow chart of acquisition threshold selection is shown as FIG. 5.

Figure 5:
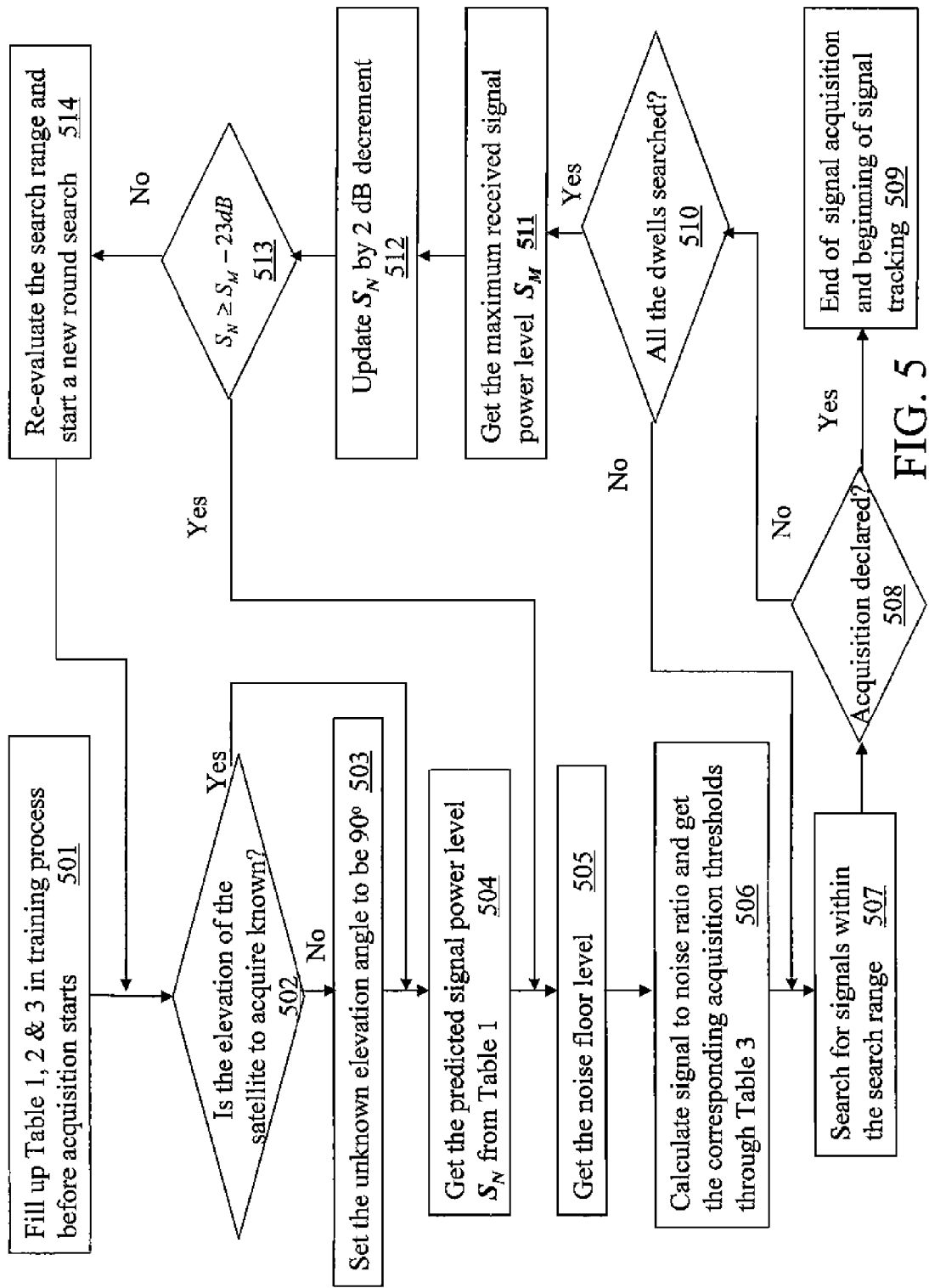
FIG. 5 is a flowchart of elevation based adaptive threshold selection according to an embodiment of the invention.

FIG. 5 is a flowchart showing a signal acquisition method with elevation based adaptive threshold selection according to an embodiment of the invention. Before acquisition starts, we need to do some preparation in the training process, as shown in block 501, to get signal power level statistics at different elevation angles, noise floors at different ambient temperatures when there is a temperature sensor in the receiver and finally determine the acquisition thresholds corresponding to different signal to noise ratios. All these statistics are stored in the form of tables (e.g., Tables 1, 2 and 3) in memory of the receiver for later use. As motioned in Section 2, if there is no temperature sensor in the receiver, one spare channel can be used to measure the noise floor after the receiver is powered on. The method is to select a PRN code of a satellite invisible at that moment or not in the constellation and then to get the average power of the noise. Using this method, we can get the noise floor values in real time and can monitor its changes.

In block 502, the processor checks whether the elevation angle of the satellite to be acquired is known. In many cases, such as in hot or warm start, the satellite elevation angle is known from ephemeris or almanac data previously received and stored in memory. However, if such information is not available, such as in the case of cold start, then the elevation angle is set to 90° in block 503. In block 503, the maximum predicted signal power level is chosen to avoid possible high false alarm rate. Then in block 504, the predicted signal power $S_N$ of the satellite to be acquired is obtained by looking up Table 1 according to the elevation angle. Similarly, in block 505, the noise floor can be obtained by looking at the Table 2 according to current ambient temperature measured by the temperature sensor. If there is no temperature sensor, then the noise floor can be monitored by one spare channel. With the predicted signal power level and noise floor, the signal to noise ratio is calculated as shown in block 506 and the corresponding acquisition threshold for this satellite is found by looking up Table 3.

In block 508, the processor searches for the signal within a predetermined search range. The search process for signal acquisition is done dwell by dwell within the search range. If signal acquisition is successful, then the search process ends and the tracking process starts as shown in block 509. If all the candidate dwells in the search range have been checked in block 510 and signal acquisition is not successful, then the most likely reason is that the acquisition threshold is not correct. This may be due to the predicted signal power level not being accurate. The signal power level in Table 1 is the highest one in that elevation band. If there is additional signal attenuation, which often happens in foliage environment or urban area, the actual received signal power level is lower than that shown in Table 1. The exact power level after attenuation is not known, which is not predictable. Therefore, the predicted signal power level has to be decreased, e.g., by 2 dB, in every try until acquisition is successful or a minimum power level is reached. Based on this new predicted signal power level, the signal to noise ratio can be calculated and a new threshold found accordingly through Table 3. In order to avoid the possible cross correlation, the minimum value of the predicted power level $S_N$ must be greater than the maximum received signal power $S_M$ from the satellite at zenith minus 23 dB as shown in block 513. This maximum value can be obtained from Table 1. The acquisition thresholds adjustment is shown in blocks 511, 512 and 513. In block 511, the maximum received signal power $S_M$ is found in Table 1. The predicted signal power $S_N$ is then updated by a 2 dB decrement in block 512. In block 513, the updated predicted signal $S_N$ is used to find an updated threshold if the $S_N \geq S_M - 23$ dB. With the updated acquisition threshold, all the candidate dwells can be searched again. After all the possible thresholds are tried and the signal cannot be acquired, then the carrier frequency and/or code phase search ranges are reevaluated and a new round search is started as shown in block 514.

The signal power level difference between satellites at zenith and at horizon might be as large as 8 dB or more. Environmental temperature also impacts the noise floor. Signal power level can be predicted by the corresponding elevation angle while noise floor can be predicted through the ambient temperature with a temperature sensor or monitored by one spare channel when there is no temperature sensor. The key of the acquisition thresholds setting scheme is to adaptively choose the proper threshold based on the predicted signal to noise ratio. In this scheme, every satellite to be acquired uses its own thresholds. This is especially useful in weak signal acquisition because of the small margin between the signal and noise floor.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

What is claimed is:

1. A method of processing signals from navigation satellites at a receiver, comprising:
    performing a learning process prior to signal acquisition to obtain a plurality of estimated values of signal-to-noise ratio, each estimated value of signal-to-noise ratio corresponding to an average signal power within an elevation band of a plurality of elevation bands defined within a range of elevation angles between the navigation satellites and the receiver;
    generating a different set of power threshold values for signal acquisition for each of the elevation bands, each power threshold value corresponding to a respective estimated value of signal-to-noise ratio such that a probability of desired signal detection is high and a probability of a false alarm detection is low for each signal received at the receiver that has an accumulated power greater than its corresponding power threshold value;
    receiving a down-converted received signal to be acquired from a transmitting satellite;
    correlating the down-converted received signal with a local replica signal to generate correlation values;
    integrating the correlation values of the received signal to generate its accumulated power;
    determining a current condition associated with the received signal based on an elevation band in which the transmitting satellite is located and noise level at the receiver;
    selecting a first power threshold value from the generated set of power threshold values using the determined current condition;
    comparing the accumulated power of the received signal with the first power threshold value; declaring signal acquisition when the accumulated power exceeds the first power threshold value;
    selecting a second power threshold value from the generated set of power threshold values when the accumulated power does not exceed the first power threshold value, wherein the second power threshold value is lower than the first power threshold value, and repeating the comparing and declaring steps using the second power threshold value.

2. The method of claim 1, wherein the power threshold values are generated as a function of the elevation angles of the navigation satellites.

3. The method of claim 1, wherein each satellite being acquired is associated with a set of power threshold values which depends on acquisition conditions.

4. The method of claim 3, wherein a highest power threshold value in each set corresponds to clear sky conditions.

5. The method of claim 3, wherein a lowest power threshold value in each set is a function of noise floor.

6. The method of claim 1, wherein a highest power threshold value corresponding to clear sky conditions is used first.

7. The method of claim 1, wherein the power threshold values are generated as a function of noise floor in the receiver and the noise floor is estimated using a separate channel.

8. The method of claim 1, wherein the power threshold values are generated as a function of noise floor in the receiver and the noise floor is estimated based on ambient temperature.

9. The method of claim 1, wherein the power threshold values generated through the learning process are stored in memory of the receiver.

10. The method of claim 1, wherein the power threshold values depend on a gain pattern of the receiver's antenna.

11. A method of processing signals from navigation satellites at a receiver, comprising:
performing a learning process prior to signal acquisition to obtain a set—plurality of estimated values of signal-to-noise ratio, each estimated value of signal-to-noise ratio corresponding to an average signal power within an elevation band of a plurality of elevation bands defined within a range of elevation angles between the navigation satellites and the receiver;
generating a different set of power threshold values for signal acquisition for each of the elevation bands, each power threshold value corresponding to a respective estimated value of signal-to-noise ratio such that a probability of desired signal detection is high and a probability of a false alarm detection is low for each signal received at the receiver that has an accumulated power greater than its corresponding power threshold value;
correlating a down-converted received signal with a local replica signal to generate correlation values;
computing an accumulated power from a received signal to be acquired from a transmitting satellite;
computing an estimated signal to noise ratio for the received signal based on an elevation band in which the transmitting satellite is located and a noise level at the receiver;
selecting a first power threshold value from the set of power threshold values based on the estimated signal to noise ratio;
comparing the accumulated power with the first power threshold value;
declaring signal acquisition when the accumulated power exceeds the first power threshold value; and
selecting a second power threshold value from the set of power threshold values when the accumulated power does not exceed the first power threshold value, wherein the second power threshold value is lower than the first power threshold value, and repeating the comparing and declaring steps using the second power threshold value.

12. The method of claim 11, further comprising determining the elevation angle of the satellite based on ephemeris data or almanac data stored in memory of the receiver.

13. The method of claim 11, further comprising:
estimating a received signal power based on the elevation angle of the satellite to the receiver;
estimating a noise floor of the receiver; and
computing the estimated signal to noise ratio based on the estimated received signal power and the estimated noise floor.

14. The method of claim 13, further comprising estimating the noise floor based on ambient temperature measured by a temperature sensor in the receiver.

15. The method of claim 13, further comprising estimating the noise floor using a separate channel in the receiver.

16. The method of claim 13, further comprising:
if the signal is not acquired using the first power threshold value, decreasing the estimated received signal power by a predetermined amount;
computing an updated signal to noise ratio based on the decreased estimated received signal power and the estimated noise floor; and
selecting the second lower power threshold value based on the updated signal to noise ratio.

17. The method of claim 16, wherein the estimated received signal power is decreased by approximately 2 dB.

18. The method of claim 11, wherein selecting the first and second power threshold value each further comprises:
providing a table of power threshold values, wherein each power threshold value in the table corresponds to a different signal to noise ratio; and
selecting the power threshold value in the table corresponding to a signal to noise ratio that is closest to the estimated signal to noise ratio.

19. A receiver for processing navigation satellite signals, comprising:
a radio frequency front-end for receiving satellite signals;
a baseband section for processing the received satellite signals into correlation values;
a processor coupled to the baseband section, wherein the processor is configured to:
integrate the correlation values of the received signal into an accumulated power;
perform a learning process prior to signal acquisition to obtain a plurality of estimated values of signal-to-noise ratio each estimated value of signal-to-noise ratio corresponding to an average signal power within an elevation band of a plurality of elevation bands within a range of elevation angles between the navigation satellites and the receiver;
generate a different set of power threshold values for signal acquisition for each of the elevation bands, each power threshold value corresponding to a respective estimated value of signal-to-noise ratio, such that a probability of desired signal detection is high and a probability of a false alarm signal detection is low for each signal received at the receiver that has an accumulated power greater than its corresponding power threshold value;
calculate an accumulated power of a down-converted received signal to be acquired from a transmitting satellite;
determine a current condition associated with the received signal based on an elevation band in which the transmitting satellite is located and a noise level at the receiver;
select a first power threshold value from the generated set of power threshold values using the determined current condition;
compare the accumulated power with the first power threshold value;
declare signal acquisition when the accumulated power exceeds the first power threshold value;
select a second power threshold value from the generated set of power threshold values when the accumulated power does not exceed the first power threshold value, wherein the second power threshold value is lower than the first power threshold value, and repeat the comparing and declaring steps using the second power threshold value.

20. The receiver of claim 19, wherein the power threshold values are generated as a function of the elevation angles of the navigation satellites.

21. The receiver of claim 19, wherein each satellite being acquired is associated with a set of power threshold values which depends on acquisition conditions.

22. The receiver of claim 21, wherein a highest power threshold value in each set corresponds to clear sky conditions.

23. The receiver of claim 21, wherein a power lowest threshold value in each set is a function of noise floor.

24. The receiver of claim 19, wherein the processor uses a highest power threshold value in the set first.

25. The receiver of claim 19, wherein the threshold power values are generated as a function of noise floor in the receiver and the processor estimates the noise floor using a separate channel.

26. The receiver of claim 19, wherein the power threshold values are generated as a function of noise floor in the receiver and the processor estimates the noise floor based on ambient temperature.

27. The receiver of claim 19, wherein processor generates the power threshold values through a learning process and stores them in memory of the receiver.

28. The receiver of claim 19, wherein the power threshold values depend on a gain pattern of the receiver's antenna.

29. The method of claim 11, wherein computing the estimated signal-to-noise ratio includes:

calibrating an estimated received signal power by considering a gain pattern of the receiver's antenna; and using the calibrated estimated value of the received signal power to compute the signal-to-noise ratio.

* * * * *